US006651104B1

(12) United States Patent
Moon

(10) Patent No.: US 6,651,104 B1
(45) Date of Patent: *Nov. 18, 2003

(54) MULTI-LAYERED INTERFACE FOR INTERCONNECTING APPLICATION PROGRAMS TO SYSTEM BUS LINES FOR ELECTRONIC DEVICES

(75) Inventor: Billy Gayle Moon, Apex, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/747,463

(22) Filed: Nov. 12, 1996

(51) Int. Cl.[7] ................................................. G06F 15/16
(52) U.S. Cl. ....................................... 709/238; 709/328
(58) Field of Search ................................ 395/680, 681, 395/881; 709/328, 321, 310, 331, 330, 238; 710/11

(56) References Cited

U.S. PATENT DOCUMENTS

| | | | | |
|---|---|---|---|---|
| 4,975,829 A | * | 12/1990 | Clarey et al. ................ | 395/681 |
| 5,265,252 A | * | 11/1993 | Rawson, III et al. ........ | 395/700 |
| 5,452,433 A | * | 9/1995 | Nihart et al. ................ | 395/500 |
| 5,465,364 A | * | 11/1995 | Lathrop et al. .............. | 395/681 |
| 5,517,636 A | * | 5/1996 | DeHart et al. ............... | 395/500 |
| 5,590,313 A | * | 12/1996 | Reynolds et al. ........... | 395/500 |
| 5,710,908 A | * | 1/1998 | Man ............................ | 395/500 |
| 5,966,545 A | * | 10/1999 | Hanif et al. ................. | 395/831 |

OTHER PUBLICATIONS

IBM TDB, "Device–Independent Support in Communication Environments", vol. 33, No. 2, pp. 99–100, Jul. 1990.*
M. Sylor, et al, "Applying Network Management Standards to System Management; the case for the Common Agent", IEEE, pp. 110–117, 1994.*

* cited by examiner

Primary Examiner—St. John Courtenay, III
Assistant Examiner—Sue Lao
(74) Attorney, Agent, or Firm—Myers Bigel Sibley & Sajovec, P.A.

(57) ABSTRACT

The present invention describes an apparatus for interconnecting hardware of an electronic device with application programs for controlling the electronic device. The apparatus is divided into three separate layers. The first layer interfaces the apparatus to the hardware of an electronic device and independently controls the hardware interface protocols necessary for interconnecting the apparatus with the hardware of an electronic device. A second layer interfaces the apparatus to application programs for controlling the electronic device. The second layer independently controls the software interface protocols necessary for interconnecting the apparatus with application programs for controlling the electronic device. A router layer routes data between the first and second layers or between independently created objects located within the first and second layers.

12 Claims, 2 Drawing Sheets

MULTI-LAYERED INTERFACE FOR INTERCONNECTING APPLICATION PROGRAMS TO SYSTEM BUS LINES FOR ELECTRONIC DEVICES

BACKGROUND OF THE INVENTION

1. Technical Field of the Invention

The present invention relates to system bus architectures for cellular telephones, and more particularly, to a multi-level interface for interconnecting a system bus line with application programs located internally or externally of a cellular telephone.

2. Description of Related Art

A system bus on future cellular telephones must provide wider capabilities than are available on existing cellular telephones. Currently, the system bus supports accessories like vehicle adaptors, battery chargers and portable hands free units. These accessories may be either dumb or intelligent. Dumb accessories are hardware controlled and communicate with the telephone through discrete signals on the system bus. Intelligent accessories contain a microprocessor and communicate to the telephone software over the system bus serial port using a defined interface protocol. Future system buses in addition to supporting these accessories will be required to support a serial communications interface to a computer, such as a PC, laptop, or PDA.

Application programs (APs) running on an external computer communicate with the cellular telephone over the system bus to an application program interface (API) residing in the telephone. An example of this type of communication over the system bus is a test AP that runs on a computer and interfaces to a test API residing in the cellular telephone. The test AP, through a menu driven display on the computer, enables an operator to initiate various tests on the cellular telephone and then display the test results. The test API performs the commanded test on the telephone and sends the results to the test AP. This example illustrates how an application communicates over the cellular telephone system bus. There is a potential for many different types of applications to use this interface for communication. The application programs will be developed by a variety of different vendors, as well as, providers of cellular telephones.

Thus, a need has arisen for a new type of bus system interface that enables a variety of software developers of APs and APIs to create products that are easily interfaced with the system bus of a cellular telephone. Thus, an interface architecture providing a standard definition for the communication interface between the application and the hardware interface of the system bus would be greatly beneficial.

SUMMARY OF THE INVENTION

The present invention overcomes the foregoing and other problems with an apparatus for interconnecting hardware of an electronic device with application programs for controlling the electronic device. The apparatus includes a first layer for interfacing the apparatus to the hardware of an electronic device. The layer independently controls the hardware interface protocols necessary for interconnecting the apparatus to the hardware of an electronic device. The layer further includes a plurality of independent objects. Each of the independent objects is able to interface the apparatus to a particular hardware component.

The apparatus includes a second layer for interfacing the apparatus to application programs for controlling the electronic device. The application programs may be located internally or externally of the electronic device. The layer independently controls the software protocols necessary for interconnecting the apparatus with the application programs. The layer further includes a plurality of independent objects for controlling an interface between the electronic device and a particular application program.

A routing layer routes data between the first and second layers in four different manners. The router may route data from first layer to the second layer, from the second layer to the first layer, between objects in the first layer, or between objects in the second layer. In this manner, the interface enables interconnection between a software application program and the system hardware in a manner such that the hardware interconnection protocols and the software interconnection protocols operate independently of each other through the separate layers of the interface.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
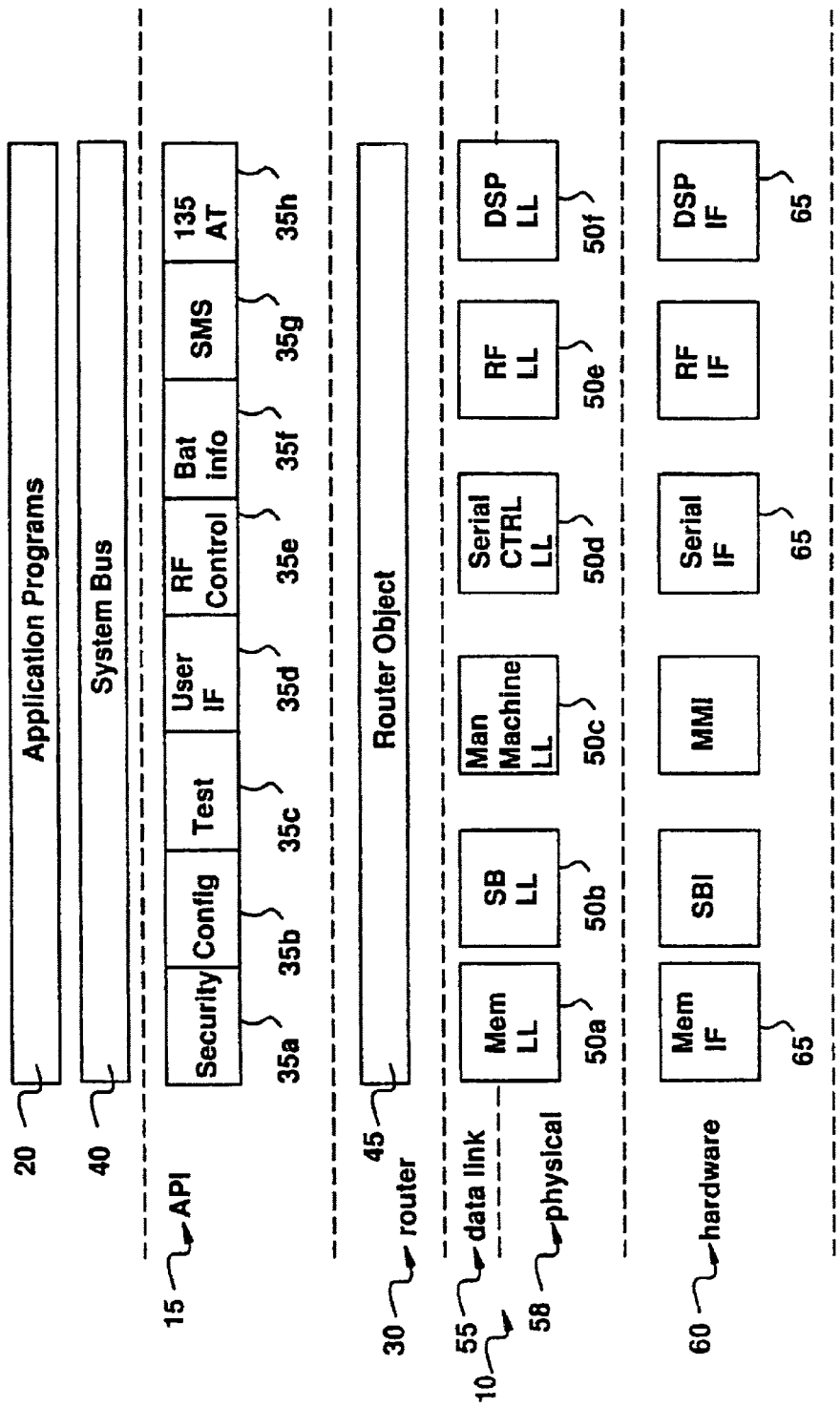
FIG. 1 is a block diagram illustrating the multi-level communications interface of the present invention.

The system bus interface of the present invention partitions the software functionality linking the system bus to the application programs into several layers. The lower layer (datalink stack) 10 enables point-to-point communications at the datalink layer between hardware components and/or hardware components and application programs. The upper layer (API layer) 15 enables high level communication protocols between the application program 20 and the application program interfaces. The application program 20 may be located internally or externally of the cellular telephone within which the interface resides. In the case of external APs, the AP 20 communicates with the API layer 15 over the system bus. For APs 20 located within the cellular telephone, communication occurs directly between the AP and API layer 15.

This configuration isolates the high-level software of the upper layer 15 from the low level software of the lower layer 10. This enables AP software and API software to communicate without needing to know the details of the hardware interface affected by the AP software commands. Likewise, it allows software controlling the hardware components to be concerned only with low level interface protocols without being concerned with any AP/API communication protocols. A middle (router) layer 30 routes data between the upper and lower layers.

The upper layer 15 comprises the application program interface (API) layer. The API layer 15 is divided into a plurality of API objects 35 where each object is independent of one another. By partitioning the API layer 15 into a plurality of independent objects 35, modular software development is allowed. Thus, many modular objects 35 for many different applications may be constructed and a particular software application need only be linked with the modular objects 35 required to carry out a particular functionality defined by the software application.

In FIG. 1 there are listed API objects for performing security functions 35a, configuration functions 35b, testing 35c, user interface applications 35d, RF control applications 35e, short messages service applications 35f, battery control 35g and 135AT control 35h. Each of the API objects 35 at this layer interfaces to a particular application program (AP). The AP may reside in a computer device, in an accessory or in the telephone itself. If the AP resides in a computer device or in an accessory, it communicates with the API layer 15 via the system bus 40. If the AP resides in the cellular telephone, it communicates to the API layer 15 directly.

The API objects 35 utilize a plurality of system procedures (SP) to carry out functionalities requested by the API. Each SP comprises an instruction or instruction set that carries out a particular action within the cellular telephone. Each SP requires certain input parameters to generate a particular result or return value. System procedures relieve the API object software developer of needing to know the details of the lower layer interface protocol. The actual software contained in each SP consists of software that controls the communication interface between the API layer 15 and the router layer 30.

The SP software creates a protocol frame from the input parameters supplied to the SP. The protocol frame consists of a header and an optional data section concatenated together. The header contains logical addresses and a command code. The logical addresses identify the source API object and the destination API object. The SP software uses the command code to map the input parameters of the SP to the data section of the protocol frame.

The middle (router) layer 30 consist of a single router object 45 responsible for routing data between the objects in the upper and lower layers. This effectively isolates the API layer 15 from the datalink stack 10 below. The router object 45 may route data in four different ways. The router object 45 routes data between two API objects 35. The router object 45 may also route data between two datalink stack objects 50. The router object 45 may further route data from an API object 35 to a datalink stacked object 50 or from a datalink stack object to an API object.

The interface protocol of the router layer 30 to the API layer 15 is the L7 protocol frame. The interface protocol between the router layer 30 and the datalink stack 10 is the L3 protocol frame. An L3 protocol frame consists of an L3 header concatenated to the L7 protocol frame. The L3 header contains physical source and destination addresses. The router object 45 creates the physical addresses from the logical addresses contained in the L7 protocol header of the L7 protocol frame. When data is routed between objects in the same layer, the router simply transfers the frame data from the source object to the destination object.

The lower level 10 consists of a datalink layer 55 and a physical layer 58. The two layers are stacked together and collectively referred to as the datalink stack. The datalink stack 10 comprises components for utilizing the communications protocol necessary for communicating with the hardware components of a cellular telephone. The physical layer 60 consists of the actual hardware interfaces necessary for connecting the system bus 40 to the cellular telephone. As with the API layer 15, the datalink stack 10 is divided into a plurality of independent objects 50. Each object 50 is responsible for interfacing the hardware layer 60 to the system bus and exercising the proper interface protocol for that hardware.

The examples of datalink stack objects 50 shown in FIG. 1 include memory 50a, system board 50b, man machine 50c, serial control 50d, RF 50e and DSP 50f. These objects 50 link the interface to the datalink layer 55 and a memory interface 55a, system board interface 55b, man machine, interface 55c, serial interface 55d, RF interface 55e and DSP interface 55f, respectively. The particular requirements of the interface protocol for each datalink stack object 50 are dependent upon the interfacing hardware. The datalink objects 50 interface with the various hardware interfaces 65. Use of the independent datalink stack objects 50 enable the addition or removal of a particular interface without affecting the remainder of the objects within the datalink stack 10.

Figure 2:
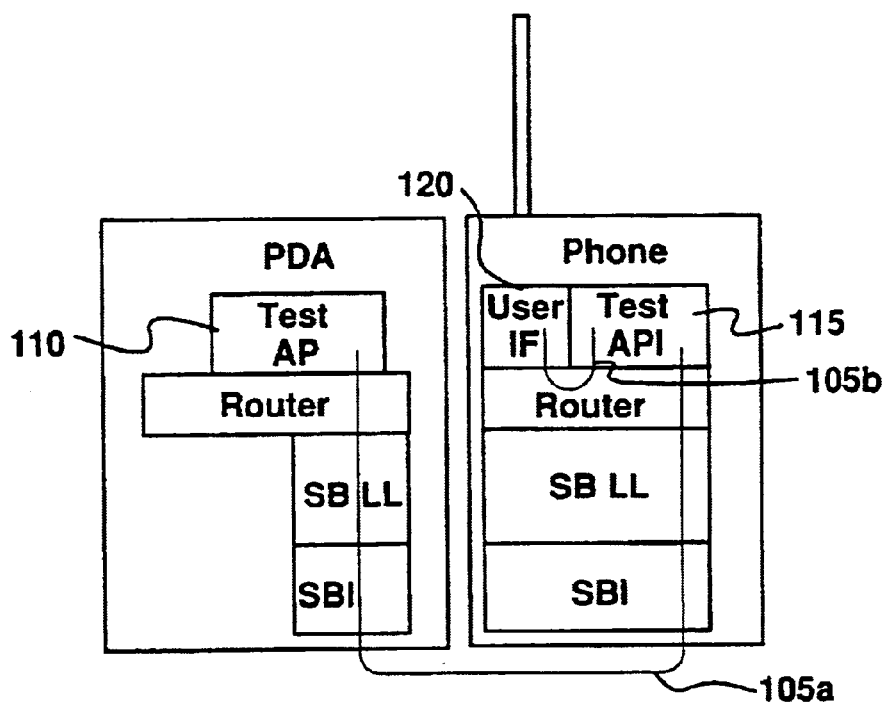
FIG. 2 is an example illustrating operation of the interface of the present invention.

Referring now to FIG. 2, there is illustrated an example of how the various layers of the interface communicate between a test application program interface 80 located within a cellular telephone 85 and a test application program 90 located within a PDA 95. In order for this architecture to properly function between an AP 90 and API 85, the multiple layers residing within the cellular telephone 85 must also reside in the connected computer or intelligent accessory (the PDA 95). The external device needs only the modular objects required for the particular AP being executed. Thus, as can be seen in FIG. 2, both PDA 95 and the cellular telephone 85 include an AP/API layer 15, a router layer 30, and a system bus object 50 from the datalink stack 10 interfacing with a system bus interface 100.

The illustration of FIG. 2 discloses two lines 105 representing communications between layers. There is a first path 105a between the PDA's test AP 110 and the cellular telephone's test API 115. A second path 105b runs between the test AP 110 and the user interface 120 within the cellular telephone 85. The PDA's test AP 110 initiates a request to perform a particular test procedure to the cellular telephone's test API 115. These two top layers communicate with the bottom layer in each device. Communication occurs between the datalink stack objects of each device through the hardware layer over a physical link. A path from the test API 115 to the user interface allows test information generated by the procedure to be displayed on the display of the cellular telephone.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. An apparatus for interconnecting hardware devices of an electronic device with application programs for controlling the electronic device, the apparatus comprising:

first means for independently controlling hardware interface protocols necessary for interacting with the hardware devices of the electronic device;

second means for independently controlling software interface protocols necessary for interacting with the application programs through an associated application protocol interface, the second means further comprising:

a plurality of system procedures responsive to at least one input parameter for generating a protocol frame containing source and destination addresses and the at least one input parameter;

a router for routing data between the first and the second means for independently controlling and for converting between the software interface protocols and the hardware interface protocols;

wherein the first means includes a first plurality of independent modules, each of the independent modules able to interface a system bus with a specific hardware device; and wherein the second means includes a second plurality of independent modules and wherein the router is configured to route data from a first module included in the first plurality of independent modules and a second module included in the second plurality of independent modules and to route data from a third module included in the second plurality of independent modules and a fourth module included in the second plurality of independent modules.

2. The apparatus of claim 1 wherein the application programs are internal to the electronic device.

3. The apparatus of claim 1 wherein the application programs are external to the electronic device.

4. The apparatus of claim 1 wherein the second means includes a plurality of independent modules, each of the modules able to interface with a particular application program.

5. The apparatus of claim 4 wherein the router further routes data between the plurality of independent modules.

6. The apparatus of claim 1 wherein the router further converts a first protocol from the first or the second means into a second protocol for data transfers between the first and the second means.

7. The apparatus of claim 1 wherein the second means is configured to utilize a plurality of predetermined instruction sets to execute operations requested by the application program.

8. An apparatus for interfacing application programs with a plurality of hardware devices within an electronic device, the apparatus comprising:

a lower level module for providing point-to-point communications between and with the plurality of hardware devices, the lower level module further including a plurality of independent modules, each of the plurality of independent modules able to interface to a particular hardware device;

an upper level module for providing software communication protocols between application programs and application program interfaces of the electronic device, the upper level module further including a plurality of independent modules, each of the plurality of independent modules able to interface with a particular application program, each of the independent modules including: a plurality of system procedures responsive to at least one input parameter for generating a protocol frame containing source and destination addresses and the at least one input parameter;

a router for routing protocol frames between the upper level module and the lower level module, between respective ones of the of plurality of independent modules in the lower level module and between respective ones of the plurality of independent modules of the upper level module, the router further able to convert between protocols to enable routing of data between the upper level module and the lower level module.

9. The apparatus of claim 8 wherein the router further routes data between the plurality of independent modules.

10. The apparatus of claim 8, wherein the lower level module includes a datalink layer and a physical layer.

11. An apparatus for interfacing application programs with a plurality of hardware devices within an electronic device, the apparatus comprising:

a lower level module for providing point-to-point communications between and with the plurality of hardware devices, the lower level module further including a plurality of independent modules, each of the plurality of independent modules able to interface to a particular hardware device;

an upper level module for providing software communication protocols between application programs and application program interfaces of the electronic device, the upper level module further including a plurality of independent modules, each of the plurality of independent modules able to interface with a particular application program, each of the independent modules including:

a plurality of system procedures responsive to at least one input parameter for generating a protocol frame containing source and destination addresses and the at least one input parameter;

a router for routing data between the upper level module and the lower level module, between the plurality of independent modules in the lower level module and between the plurality of independent modules of the upper level module, the router further able to convert between protocols to enable routing of data between the upper level module and the lower level module; and wherein the upper level module includes a second plurality of independent modules and wherein the router is configured to route data from a first module in the first plurality of independent modules and a second module in the second plurality of independent modules and to route data from a third module in the second plurality of independent modules and a fourth module in the second plurality of independent modules.

12. The apparatus of claim 1, wherein the first means includes a datalink layer and a physical layer.

* * * * *

UNITED STATES PATENT AND TRADEMARK OFFICE
CERTIFICATE OF CORRECTION

PATENT NO.   : 6,651,104 B1                                                Page 1 of 1
DATED        : November 18, 2003
INVENTOR(S)  : Moon It is certified that error appears in the above-identified patent and that said Letters Patent is hereby corrected as shown below:

<u>Title page,</u>
Item [56], References Cited, the following should be included:
-- FOREIGN PATENT DOCUMENTS
WO      WO 96/06399   12/1999 --

<u>Column 6,</u>
Line 3, should read -- respective ones of the plurality of independent --

Signed and Sealed this

Fourth Day of May, 2004

JON W. DUDAS
*Acting Director of the United States Patent and Trademark Office*